(No Model.)
F. L. LEAVITT.
PREPARING MEDICINAL PLASTERS.
No. 411,815. Patented Oct. 1, 1889.
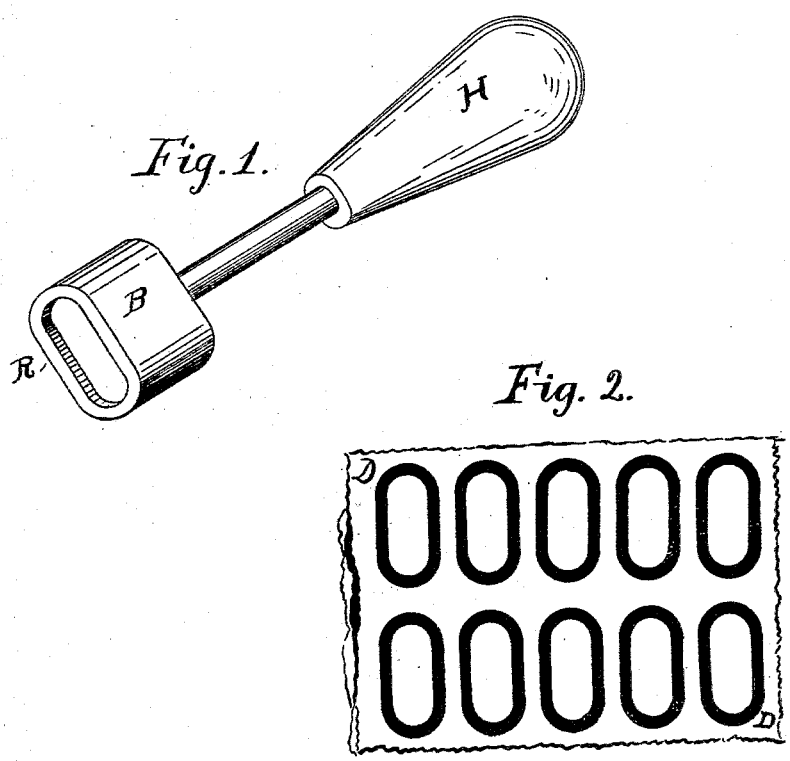
WITNESSES:
Percy R. Howe
Ezra H. White
INVENTOR
Fred. L. Leavitt
BY
Almon Robinson
ATTORNEY

UNITED STATES PATENT OFFICE.

FRED L. LEAVITT, OF AUBURN, MAINE.

PREPARING MEDICINAL PLASTERS.

SPECIFICATION forming part of Letters Patent No. 411,815, dated October 1, 1889.

Application filed April 5, 1889. Serial No. 306,096. (No specimens.)

*To all whom it may concern:*

Be it known that I, FRED L. LEAVITT, a citizen of the United States, residing at Auburn, in the county of Androscoggin and State of Maine, have invented certain new and useful Improvements in Preparing Medicinal Plasters, of which the following is a specification.

My invention relates to that class of plasters in which a medicinal powder intended to act upon the skin or mucous membrane is inclosed between layers of flexible material. Heretofore such plasters have been made by stitching together the edges of the inclosing-layers above mentioned.

The object of my invention is to reduce the cost of manufacture and at the same time to prepare a medicinal plaster which shall be for many purposes superior to those now in use. This end I attain in the following manner.

I first spread upon a flat surface as large a sheet or strip of cotton cloth as can be conveniently operated upon at one time. Upon this I lay a similar sheet or strip of the material known in the trade as "rubber tissue." Upon the rubber tissue I place at suitable intervals the proper amount of the medicinal powder to form one plaster. I next cover the whole with another sheet or strip of cotton cloth. Having provided myself with a tool which corresponds in outline with the intended plaster, and which has the central part of its working-surface hollowed out, so as to have a flat-faced rim—that for small plasters may be an eighth of an inch, or less, in width—I heat this iron to such a temperature as will melt the rubber tissue without disorganizing it. Placing this heated tool upon the above-described layers of cloth and rubber tissue at a spot where the rim completely surrounds a pile of the medicinal powder, I press it down for an instant, causing the tissue to melt and firmly cement to itself the pieces of cloth. I go over the sheet in the same way and then separate the plasters from each other by cutting them out with a die, or in any other convenient manner.

In the accompanying drawings, Figure 1 is a view of the heating-tool mentioned above, in which B is the body, R the rim, and H the handle. This tool I prefer to make of iron; but copper, brass, or soapstone may be substituted therefor without notable difference. Fig. 2 shows a sheet of completed plasters ready to be cut apart. In this figure D D are the outer cemented rims of the finished plasters.

It will be readily understood from the foregoing description that the process therein set forth can be carried out very rapidly, and with ordinary care the result is uniformly reliable. As the office of the lower sheet of cloth is merely that of a strong backing for the rubber tissue, any other flexible material to which the melted rubber will adhere can be substituted for the cloth when it is for any reason desirable. Any desired medicinal powder which does not have an injurious chemical action upon the rubber tissue may be employed as filling.

The completed plasters are moistened through the cloth surface and then applied in precisely the same way as the well-known mustard, capsicum, and other similar plasters now in use.

Articles equivalent to the product of the process hereinbefore set forth are claimed in an application for a patent for a device for applying medicines filed by me simultaneously herewith on the 5th of April, 1889, and serially numbered 306,097.

What I claim in this application, and desire to secure by Letters Patent, is—

1. The process of forming medicinal plasters, which consists in placing a suitable amount of a medicinal substance upon a piece of rubber tissue, which rests upon a piece of cloth, covering these with another piece of cloth, and joining the three thicknesses into one at the boundary-line of the plaster by the combined effect of heat and pressure, all as set forth.

2. The process of forming a compound sheet of medicinal plasters, which consists in placing a sheet of rubber tissue upon a sheet of stronger flexible material, placing upon the rubber tissue separate portions of the medicinal substance, covering with a sheet of cloth, and then uniting the three layers at and near a line surrounding each separate portion of the medicinal substance by pressing with a heated iron, all as set forth.

FRED L. LEAVITT.

Witnesses:
PERCY R. HOWE,
EZRA H. WHITE.